United States Patent
Hammann et al.

(10) Patent No.: US 9,317,031 B2
(45) Date of Patent: Apr. 19, 2016

(54) APPARATUS AND METHODS FOR CONTROLLING MACHINING SYSTEMS

(75) Inventors: Gerhard Hammann, Korntal-Muenchingen (DE); Arnd Szelagowski, Kirchheim unter Teck (DE); Mathias Schlotter, Korntal-Muenchingen (DE); Klaus Bauer, Ditzingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 13/091,201

(22) Filed: Apr. 21, 2011

(65) Prior Publication Data

US 2011/0210107 A1  Sep. 1, 2011

Related U.S. Application Data

(63) Continuation of application No. PCT/DE2009/001470, filed on Oct. 21, 2009.

(30) Foreign Application Priority Data

Oct. 21, 2008 (DE) .................. 10 2008 052 592

(51) Int. Cl.
*B23K 26/00* (2014.01)
*G05B 19/4093* (2006.01)

(52) U.S. Cl.
CPC  *G05B 19/40937* (2013.01); *G05B 2219/36089* (2013.01); *G05B 2219/36307* (2013.01); *Y02P 90/265* (2015.11)

(58) Field of Classification Search
CPC ...................................... B23K 26/00
USPC .............. 219/121.6, 121.61, 121.66, 121.67, 219/121.73
See application file for complete search history.

(56) References Cited

U.S. PATENT DOCUMENTS

| | | | | |
|---|---|---|---|---|
| 4,531,192 A | * | 7/1985 | Cook | 700/258 |
| 4,547,855 A | * | 10/1985 | Lanyi et al. | 700/166 |
| 4,992,948 A | | 2/1991 | Pilland et al. | |
| 5,588,200 A | * | 12/1996 | Schudel | 29/603.01 |

(Continued)

FOREIGN PATENT DOCUMENTS

| | | |
|---|---|---|
| CN | 101068635 A | 11/2007 |
| DE | 69828671 T2 | 5/2006 |

(Continued)

OTHER PUBLICATIONS

Notification of Transmittal of Translation of International Preliminary Report on Patentability from corresponding application No. PCT/DE2009/001470, mailed May 5, 2011, 8 pages.

(Continued)

*Primary Examiner* — Dana Ross
*Assistant Examiner* — Ayub Maye (57) ABSTRACT

The present invention is directed to implementations of apparatus and methods for controlling a machining system by means of a control program. In some implementations, apparatus include a data storage, in which standard machining parameters are stored to which the control program refers, an adjustment device can be activated in accordance with the invention for adjusting the machining parameters in a preset fashion based on the material properties of a workpiece to be processed and/or a selectable machining target value.

10 Claims, 5 Drawing Sheets

(56) References Cited

U.S. PATENT DOCUMENTS

| | | | | |
|---|---|---|---|---|
| 5,659,479 | A | * | 8/1997 | Duley et al. .................... 700/166 |
| 6,271,579 | B1 | * | 8/2001 | Going et al. .................... 257/664 |
| 6,438,445 | B1 | | 8/2002 | Yoshida et al. |
| 6,470,796 | B2 | | 10/2002 | Hayashi |
| 6,553,191 | B1 | * | 4/2003 | Nakane .......................... 399/38 |
| 7,107,118 | B2 | * | 9/2006 | Orozco et al. ................. 700/166 |
| 7,149,602 | B2 | * | 12/2006 | Watanabe et al. ............. 700/245 |
| 7,643,905 | B2 | * | 1/2010 | Watanabe et al. ............. 700/253 |
| 8,293,035 | B2 | * | 10/2012 | Zurecki et al. ................. 148/511 |
| 2003/0023341 | A1 | | 1/2003 | Sagawa et al. |
| 2003/0045964 | A1 | * | 3/2003 | Lottgen et al. ................ 700/180 |
| 2003/0192865 | A1 | | 10/2003 | Cole et al. |
| 2005/0226306 | A1 | * | 10/2005 | Glantz et al. .................. 372/109 |
| 2009/0294421 | A1 | * | 12/2009 | Hu et al. ..................... 219/121.71 |

FOREIGN PATENT DOCUMENTS

| | | | |
|---|---|---|---|
| DE | 60033267 | T2 | 11/2007 |
| EP | 0311703 | A1 | 4/1989 |
| JP | 57206913 | A | 12/1982 |
| JP | 59214540 | A | 12/1984 |
| JP | 60051905 | A | 3/1985 |
| JP | 05000388 | | 3/1986 |
| JP | 61046390 | A | 3/1986 |
| JP | 01234135 | A | 9/1989 |
| JP | 04289055 | A | 10/1992 |
| JP | 5000338 | A | 1/1993 |
| JP | 07241686 | A | 9/1995 |
| JP | 2003071578 | A | 3/2003 |
| JP | 2004223553 | A | 8/2004 |
| JP | 2005108144 | A | 4/2005 |
| JP | 2008036812 | A | 2/2008 |

OTHER PUBLICATIONS

Office Action from corresponding Korean Application No. 10-2011-7010316, mailed Oct. 29, 2012, 4 pages.

* cited by examiner

APPARATUS AND METHODS FOR CONTROLLING MACHINING SYSTEMS

CROSS-REFERENCE TO RELATED APPLICATIONS

This application is a continuation of, and claims priority under 35 U.S.C. §120 to, PCT/DE2009/001470, filed on Oct. 21, 2009, and designating the U.S., which claims priority under 35 U.S.C. §119 to German Patent Application No. 10 2008 052 592.8, filed on Oct. 21, 2008. The contents of the prior applications are hereby incorporated by reference in their entirety.

TECHNICAL FIELD

The invention relates to apparatus and methods for controlling a machining system by means of a control program.

BACKGROUND

Machining systems are controlled by means of numerical control mechanisms, which are generally subdivided into three control units, an MMC operating system (Man Machine Communication) as data input and visualization unit, a PLC control unit (programmable logic controller) and an NC control unit. Data and control commands are input via the MMC operating system, are passed on to the NC control unit, are decoded in the NC control unit, and are separately further processed in accordance with geometric and technology data (NC control unit) and switching commands (PLC control unit). The NC and PCL control units transmit the actual machine state to the MMC control unit for visualization.

Figure 1:
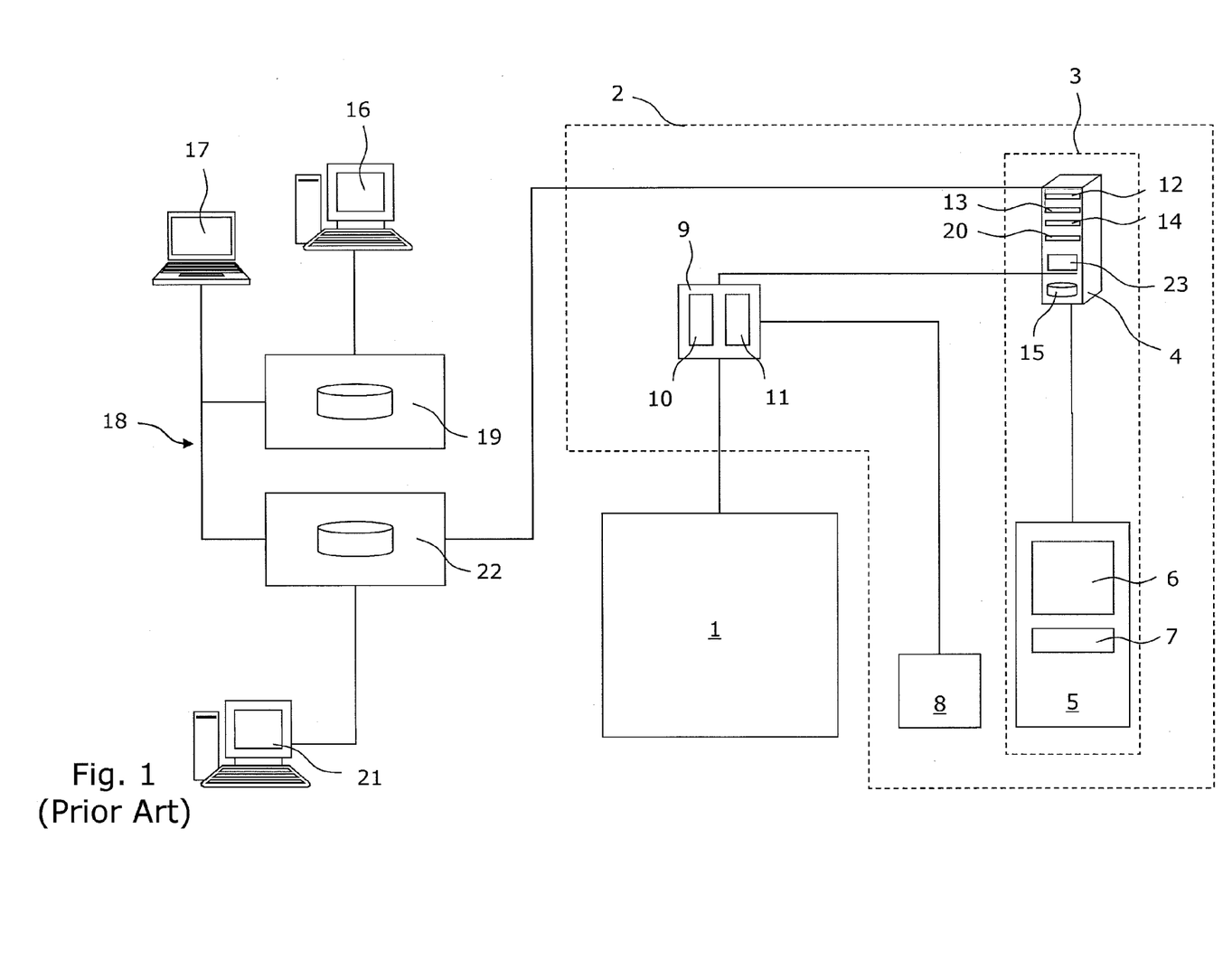
FIG. 1 shows a conventional apparatus for controlling a machining system.

FIG. 1 shows a conventional machining system 1 which is controlled by means of a numerical control apparatus 2. On the hardware side, the control apparatus 2 comprises an MMC operating system 3 with a control computer 4, designed as an industrial PC, and an operating device 5 with a display 6 as display unit, and an input unit 7 which is designed for example in the form of a keyboard, mouse or touch panel. The control apparatus 2 furthermore comprises a machine control panel 8 for manual operation of the machining system 1, wherein mainly safety-relevant operations are performed, and an NCU assembly 9 (Numerical Control Unit) with integrated NC control unit 10 and PLC control unit 11. The NC and PLC control units 10, 11 can also be designed in the form of separate assemblies.

On the software side, the control apparatus 2 comprises an operating software 12 for controlling the machining system 1; software modules 13 for job management, tool management and pallet management; program management 14 for managing control programs; and a data storage 15 in which standard machining parameters for the control programs are stored. The term "control program" includes, in addition to the NC program, all technology data that is outsourced from the NC program to external data storages. Further applications, such as for example a construction system, a programming system or a combined construction and programming system, can moreover be installed on the control computer 4.

A design engineer, a programmer and a machine operator are involved in the production of a component on the machining system 1, which task can, however, also be performed in part in personal union by one or two persons. The component is constructed by means of a construction system 16 (CAD system) or a combined construction and programming system 17 (CAD-/CAM system), wherein the abbreviations CAD and CAM stand for Computer Aided Design and Computer Aided Manufacturing. Finished construction drawings are stored on a common CAD data storage 19 provided in a network 18 for this purpose, which CAD data storage can be accessed by the programmers when required.

The machining system 1 is controlled by control programs which are created by means of a programming system or manually on the operating device 5 of the MMC operating system 3. Programming systems know basic and special NC functions and know which technology data is required and which machining rules apply. Programming can therefore be automatically defined and a control program can be generated. In the embodiment shown in FIG. 1, in addition to the combined construction and programming system 17, one further combined construction and programming system 20 is installed on the control computer 4 and a programming system 21 (CAM system) is installed in the network 18. The programming systems 17, 20, 21 are connected to a CAM data storage 22 which can be accessed by the programmers and machine operators. The programmer stores the finished control programs in the CAM data storage 22. The machine operator can access the CAM data storage 22 and import the control programs from the CAM data storage 22 into the program management 14 of the control computer 4.

During programming, the programmer determines machining of a component. He/she determines which tools are used, the order of machining and which machining parameters apply, for example, for laser power and feed rate. Programming systems support the programmer in finding suitable machining parameters and machining strategies for his/her machining task. The information about suitable machining parameters and machining strategies is contained in so-called technology tables and sets of rules which define the data storage 15. Suitable machining parameters for all relevant values, which allow reliable machining, are stored in a technology table in dependence on the type of material, the material thickness and the machining method. If required, technology tables are defined in dependence on further parameters. For laser cutting, this includes, for example, the contour size which is subdivided into small, medium and large, and the machine type on which machining is to be performed.

The technology tables differentiate between general normally read-only technology tables of the machine manufacturer and customer-specific technology tables. General technology tables are determined by the machine manufacturer with great expense and are delivered to the customers together with the numerical control apparatus 2 of the machining system 1. Customer-specific technology tables can be created and changed by a programmer or machine operator. Machining parameters which are adapted to the machining tasks of a special client are stored in customer-specific technology tables. The machining parameters stored in the general technology tables are called "standard machining parameters" within the scope of this application.

For determining the standard machining parameters, machine manufacturers carry out uncountable parameter variations and evaluate the machining results. The decision about which machining parameters are stored in the technology table depends among others on the boundary conditions. When machining is to be performed with maximum machining quality, the machining parameters differ from those for machining with maximum speed. The machining parameters stated by the machine manufacturer in the general technology tables generally represent a compromise of different boundary conditions such as quality, process safety and speed. In general, the programmer and the machine operator do not know under which boundary conditions the machine manufacturer has determined the machining parameters of the general technology tables.

The properties of the material used have a considerable influence on the process safety of the machining process and the quality of the machining result. This can result in that machining parameters which have produced satisfactory machining results for a specific material, produce unsatisfactory machining results after change of the material supplier or when a different material charge is used, such that adjustment of the machining parameters is required.

Figure 2:
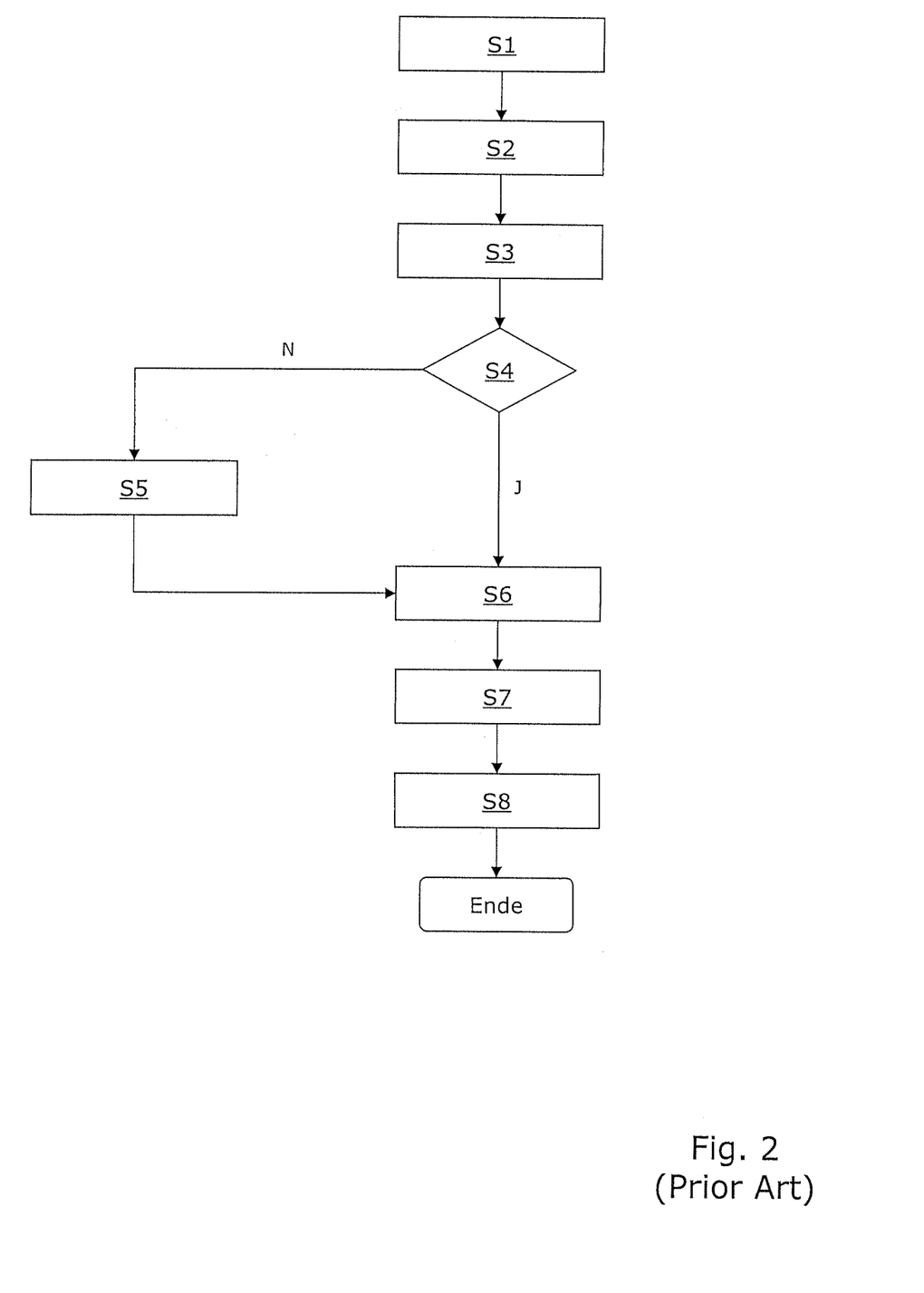
FIG. 2 shows a conventional method for controlling a machining system in the form of a flow chart.

FIG. 2 shows a conventional method for controlling a machining system by means of the control apparatus 2 shown in FIG. 1 in the form of a flow chart.

In step S1, the machine operator selects a control program that is stored in the program management 14 from the operating software 12 of the machining system 1. The control program refers to standard machining parameters which are stored in the data storage 15 on the control computer 4. The proposed standard machining parameters are transferred in step S2 from the data storage 15 into a storage 23 of the control computer 4 and are displayed on the display 6 of the operating device 5 in step S3.

In step S4, the machine operator decides whether he/she accepts the proposed standard machining parameters of the data storage 15 or whether changes are required. When the machine operator does not accept the proposed standard machining parameters (N in step S4), the machine operator changes the machining parameters in step S5. After step S5 or when the machine operator accepts the proposed standard machining parameters of the data storage 15 (J in step S4), the machining parameters are written from the storage 23 into a transmission file and stored in step S6. The machining parameters are thereby prepared in such a fashion that they can be read and processed by the NC control unit 10. In step S7, the control program is transferred from the control computer 4 to the NC control unit 10 and in step S8 the transfer file is transferred from the control computer 4 to the NC control unit 10. After step S8, the conventional method for controlling the machining system is terminated.

The adjustment of the machining parameters to changed boundary conditions requires programmers and/or machine operators with a great deal of experience, since the machining parameters depend on each other and moreover influence the machining process and the machining result in a non-linear way. Inexperienced programmers and machine operators face the great risk of changing the machining parameters in the wrong way. The time that an inexperienced machine operator requires for correctly changing the plurality of machining parameters can be very long and cause unnecessary cost due to the material used and the machine times.

SUMMARY

Implementations of the present disclosure are generally directed to apparatus and methods for controlling a machining system which supports the programmer and/or the machine operator in optimizing the machining process and/or the machining results. In some aspects, an adjustment device can be activated to adjust the machining parameters in a preset fashion to the material properties of a workpiece to be processed and/or to a selectable machining target value.

In some aspects, the adjustment device can be designed in such a fashion that the machining parameters are adjusted to the process safety of the machining process, to the quality of the machining result and/or to the machining speed as machining target value.

In some aspects, the adjustment device is designed in such a fashion that the machining parameters are gradually adjusted in several adjustment steps to the material properties of the workpiece to be processed and/or to the machining target value.

In some aspects, the adjustment device includes correction rules with which the standard machining parameters are changed. The correction rules for the machining parameters can be stored in a data storage device.

In some aspects, at least one detector device monitors the machining process and/or the material properties and detects a measuring signal, and an evaluation device communicates with the detector device and detects from the measuring signal of the detector device an actual value for the machining process and/or the material properties.

In some aspects, machining parameters are adjusted by means of an adjustment device in a preset fashion to the material properties of a workpiece to be processed and/or to a selectable machining target value, and the control program accesses the adjusted machining parameters.

In some aspects, the adjusted machining parameters can be calculated by the adjustment device and can be stored in a transmission file.

In some aspects, the detector device detects a measuring signal and an evaluation device that communicates with the detector device determines an actual value for the machining process and/or the material properties. The machining parameters can be adjusted to a target value, selected by the machine operator, by means of the adjustment device in a preset fashion in correspondence with the actual value determined by the evaluation device.

Further advantages and advantageous implementations of the subject matter of the invention can be extracted from the description, the drawing and the claims. The features mentioned above and below may be used in accordance with the invention either individually or collectively in arbitrary combination. The implementations shown and described are not to be understood as an exhaustive enumeration but have exemplary character for describing the invention.

DETAILED DESCRIPTION

Figure 3:
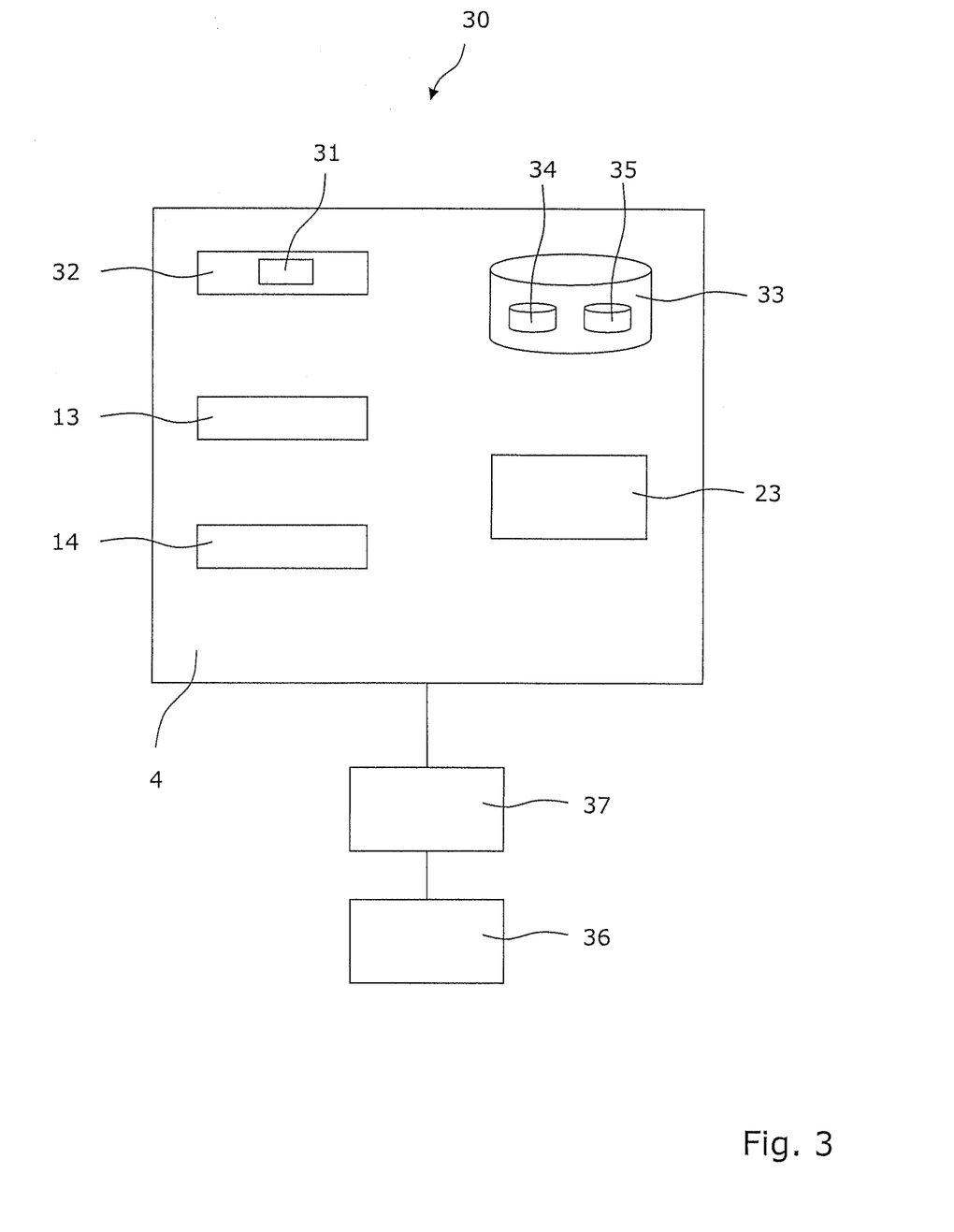
FIG. 3 shows an inventive apparatus for controlling a machining system with an adjustment device.

FIG. 3 shows an apparatus 30 for controlling a machining system, in which the machining parameters which the control program accesses are adjusted by means of an adjustment device 31 to differing material properties of the workpiece used or to a machining target value selected by the machine operator.

In some implementations, the control apparatus 30 differs from the conventional control apparatus 2 of FIG. 1 by a modified operating software 32 for controlling the machining system 1 and a modified data storage 33 in which the machining parameters for the control programs are stored. On the software side, the control apparatus 30 includes, in addition to the operating software 32 and the data storage 33 such as the conventional control apparatus 2, the software modules 13 for job management, tool management and pallet management, and the program management 14 for managing the control programs.

The operating software 32 of the control apparatus 30 differs from the conventional operating software 12 of the control apparatus 2 by the adjustment device 31 by means of which the machining parameters are adjusted to differing material properties of the workpiece used or to a machining target value, for example, process safety or machining quality, selected by the machine operator.

In addition to the standard machining parameters of the conventional data storage 15, the data storage 33 stores correction rules for changing the standard machining parameters upon activation of the adjustment device 31 for improving the machining process or improving the quality of the machining result. The correction rules state which machining parameters are to be changed by which value, wherein the changes can be stated in the form of absolute or relative values. The adjusted machining parameters are calculated by the adjustment device 31 from the standard machining parameters and the correction rules, and are stored in a transmission file in the storage 23 of the control computer 4. The standard machining parameters are stored in a first database part 34 and the correction rules are stored in a second database part 35 of the data storage 33.

The changes to the machining parameters by means of the correction rules can be performed gradually, i.e. in several adjustment steps, or continuously. Continuous adjustment of the machining parameters is reasonable, in particular, when the actual state of the machining process or the material properties of the workpiece used are determined by means of detector and evaluation devices. During adjustment of the machining parameters in several adjustment steps, the machining parameters are changed in correspondence with the selected target value in larger steps for increasing, for example, the process safety of the machining process. The laser power and the feed rate are, for example, reduced by 4% or by 10% in a first adjustment step and in a second adjustment step by 5% or 25%. It is clear that, in addition to laser power and feed rate, also further machining parameters can be adjusted, if necessary. The increased process safety of the second adjustment step compared to the first adjustment step is achieved by the machine operator at the expense of a lower feed rate and therefore a longer machining time.

The control apparatus 30 moreover has a detector device 36 and an evaluation device 37 which is connected to the detector device 36.

Figure 4:
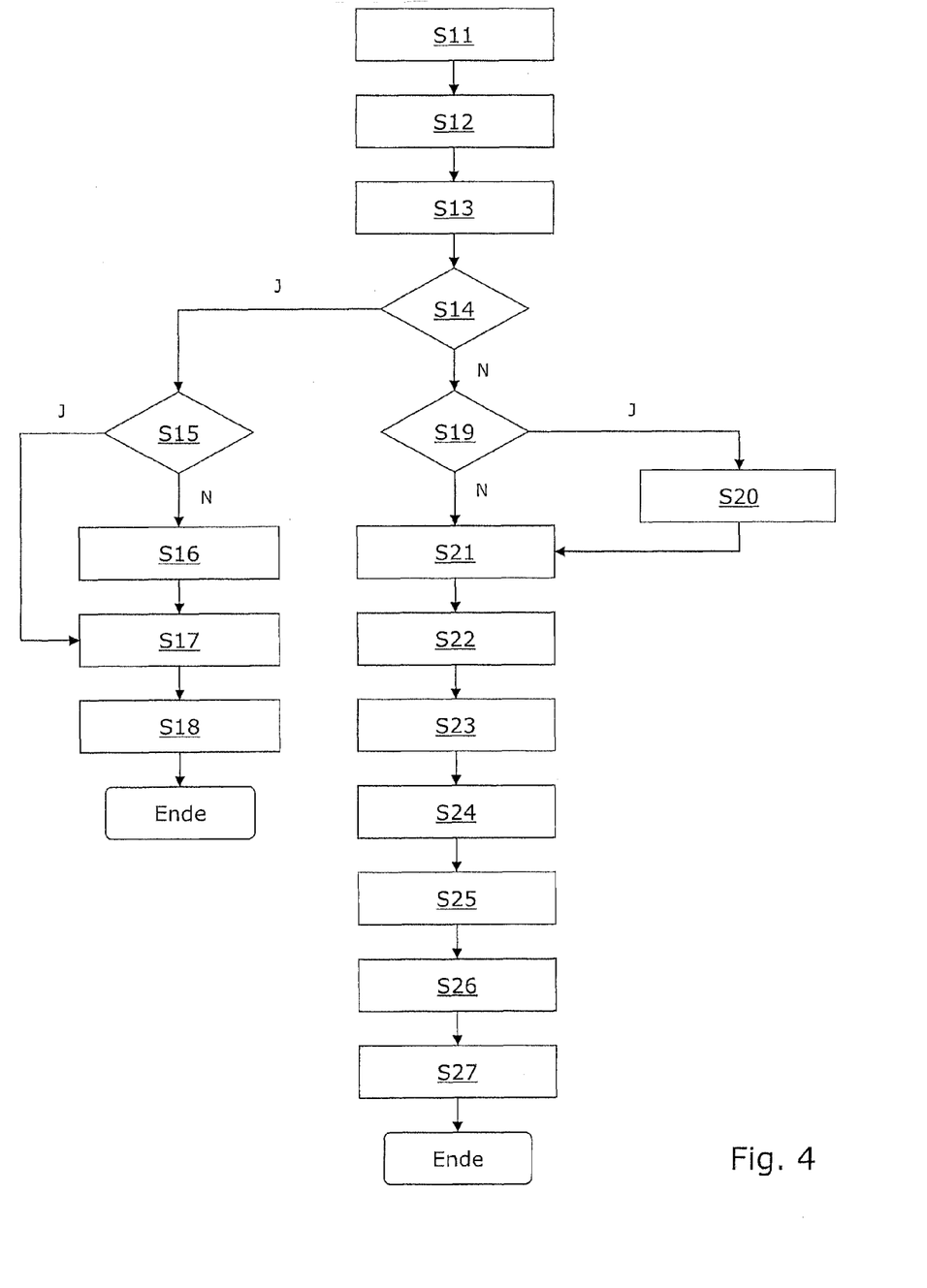
FIG. 4 shows a first embodiment of an inventive method for controlling a machining system in the form of a flow chart.

FIG. 4 shows an implementation of a method for controlling a machining system in the form of a flow chart. The machining parameters are adjusted to differing material properties of the workpiece used and/or to a machining target value selected by the machine operator by means of the adjustment device 31 of the control apparatus 30 of FIG. 3.

In step S11, the machine operator selects a control program from the operating software 32 of the machining system 1, which control program is stored in the program management 14 of the control computer 4. The control program refers to standard machining parameters which are stored in the database part 34 of the data storage 33. The standard machining parameters are transferred in a step S12 from the data storage 33 into the storage 23 of the control computer 4 and, if required, are displayed on the display 6 of the operating device 5 in step S13.

In step S14, the machine operator decides whether he/she accepts the standard machining parameters of the data storage 33 or whether adjustment of the machining parameters by means of the adjustment device 31 is required. In some implementations, to evaluate whether the standard machining parameters are suited for a machining job, the machine operator initially performs a machining job and evaluates the machining result. In some implementations, the machine operator may know from former machining jobs whether the standard machining parameters are suitable.

When the standard machining parameters are suited for the present machining job (J in step S14), the machine operator checks in step S15 whether the adjustment device 31 is deactivated. When the adjustment device 31 is not deactivated (N in step S15), the machine operator deactivates the adjustment device 31 in step S16.

After step S16 or when the adjustment device 31 is deactivated (J in step S15), the method is continued with steps S17 and S18 which correspond to the steps S6 and S7 of the conventional control method shown in FIG. 2. The standard machining parameters are written from the storage 23 of the control computer 4 into the transmission file in step S17. In step S18, the control program and the transmission file are transferred by the control computer 4 to the NC control unit 10. After step S18, the inventive method for controlling the machining system is terminated.

When the standard machining parameters are not suited for the present machining job (N in step S14), the machine operator checks in step S19 whether the adjustment device 31 is deactivated. When the adjustment device 31 is deactivated (J in step S19), the machine operator activates the adjustment device 31 in step S20.

After step S20 or when the adjustment device 31 is activated (not deactivated) (N in step S19), the machine operator decides in step S21 to which target value the machining parameters shall be adjusted. For example, the target value of the machining parameters can be adjusted based on whether the process safety of the machining process is to be increased, the machining quality is to be improved or the machining speed is to be increased.

In step S22, the adjustment device 31 proposes to the machine operator several adjustment steps for the selected target value. The machine operator determines the adjustment step in step S23 according to which the machining parameters are adjusted. In step S24, the adjustment device 31 calculates the adjusted machining parameters which correspond to the set adjustment step and shows the adjusted machining parameters on the display 6 of the operating device 5. The adjusted machining parameters are calculated from the standard machining parameters, which are transmitted from the data storage 33 into the storage 23 of the control computer 4 in step S13, and from the correction rules. The machine operator releases the adjusted machining parameters in step S25. In step S26, the adjusted machining parameters are written and stored in the transmission file.

The operating software starts in step S27 with transmission of the adjusted machining parameters to the NC control unit 10. After step S27, the method for controlling the machining system is terminated.

Figure 5:
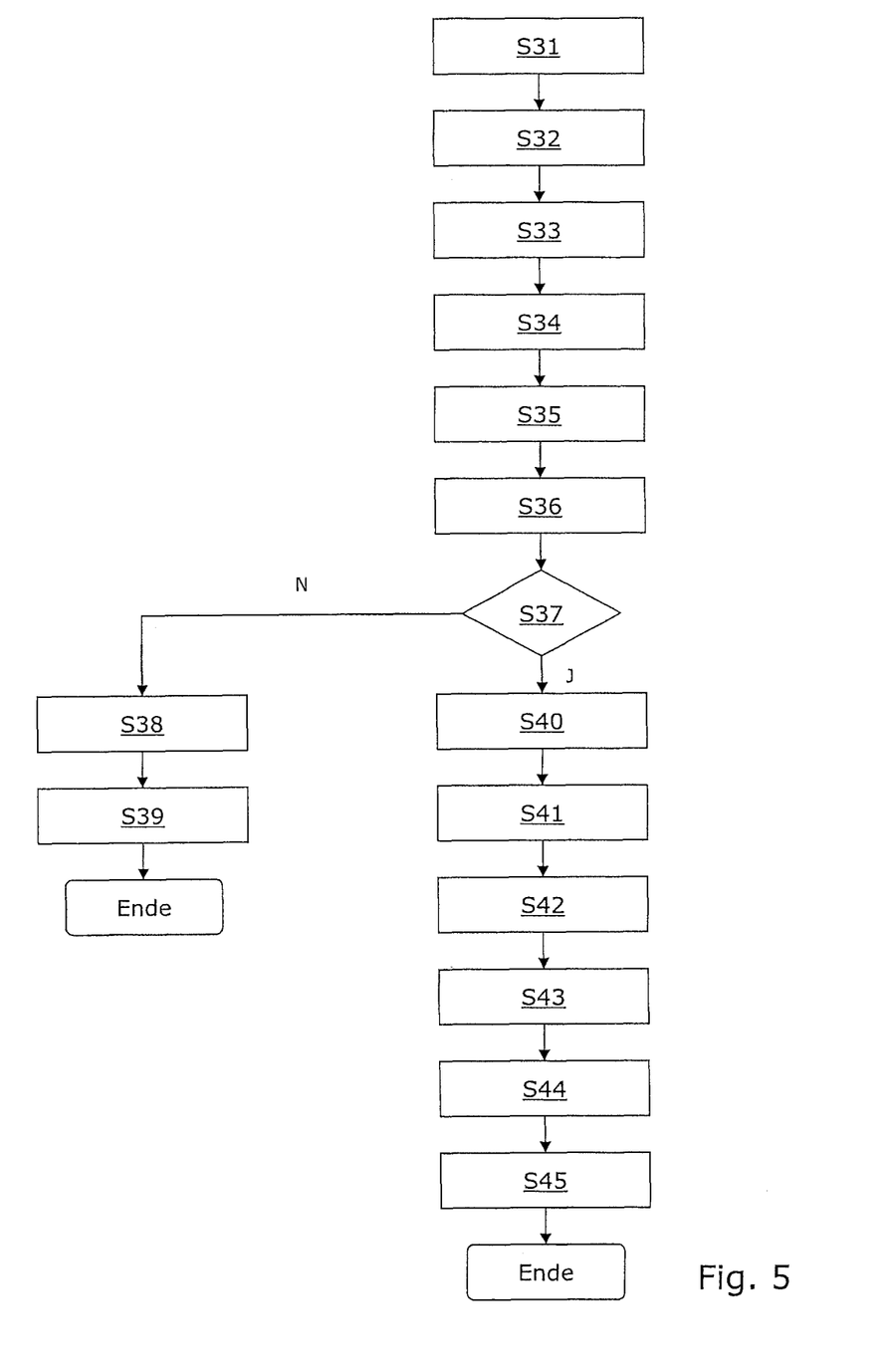
FIG. 5 shows a second embodiment of an inventive method for controlling a machining system in the form of a flow chart.

FIG. 5 shows another implementation of a method for controlling a machining system 1 in the form of a flow chart, in which the properties of the material used are measured by the detector device 36 and evaluated by the evaluation device 37 which is connected to the detector device 36.

In step S31, the machine operator starts a control program in the operating software 32 of the machining system 1, which control program is stored in the program management 14 of the control computer 4. The control program refers to standard machining parameters which are transmitted from the data storage 33 into the storage 23 of the control computer 4 in step S32 and are displayed on the display 6 of the operating device 5 in step S33.

In step S34, the machine operator activates the detector and evaluation devices 36 and 37 which determine an actual value in step S35 which reflects the properties of the material. Based on the actual value determined by the evaluation devices 37, the machine operator receives in step S36 a recommendation as to whether the machining parameters shall be adjusted due to differing material properties. The machine operator decides in step S37 whether the machining parameters shall be adjusted.

When adjustment of the machining parameters is not to be performed (N in step S37), the method is continued with steps S38 and S39 which correspond to the steps S6 and S7 of the conventional control method shown in FIG. 2. In step S38, the standard machining parameters are written from the storage 23 of the control computer 4 into the transmission file and in step S39, the control program and the transmission file are transferred from the control computer 4 to the NC control unit 10. After step S39, the method for controlling the machining system is terminated.

When the machining parameters are to be adjusted to the differing material properties (J in step S37), the machine operator activates the adjustment device 31 in step S40. The adjustment device 31 proposes to the machine operator an adjustment step in step S41, in accordance to which the machining parameters are adjusted to the differing material properties.

In addition to adjustment of the machining parameters in several adjustment steps, it is also possible to continuously adjust the machining parameters, wherein each actual value determined by the evaluation device 37 is associated with a parameter set of correction rules in a preset fashion. The gradual adjustment of the machining parameters is advantageous compared to the continuous adjustment in that only a few parameter sets of correction rules must be determined and stored. In contrast thereto, the continuous adjustment of the machining parameters is advantageous in that the change of the machining parameters is almost optimally adjusted to the differing material properties.

In step S42, the adjustment device 31 calculates the adjusted machining parameters which correspond to the adjusted adjustment step and shows the adjusted machining parameters on the display 6 of the operating device 5. The machine operator releases the adjusted machining parameters in step S43. In step S44, the adjusted machining parameters are written and stored in the transmission file. The operating software 32 starts in step S45 with the transmission of the adjusted machining parameters to the NC control unit 10. After step S45, the method for controlling the machining system is terminated.

A number of implementations of the invention have been described. Nevertheless, it will be understood that various modifications may be made without departing from the spirit and scope of the invention. Accordingly, other implementations are within the scope of the following claims.

What is claimed is:

1. A laser machining system configured to laser cut a plurality of materials using a control program, wherein the laser machining system comprises:
   one or more processors;
   an adjustment device; and
   a data storage coupled to the one or more processors and the adjustment device, in which standard laser machining parameters and instructions are stored thereon which, when executed by the one or more processors, cause the one or more processors to perform operations comprising:
   accessing the standard laser machining parameters using the control program;
   receiving an operator input indicating that adjustment of the machining parameters by the adjustment device is required;
   based on receiving the operator input, selectively adjusting, using the adjustment device, the standard laser machining parameters in a preset fashion based on whether a process safety of laser machining is to be increased to provide adjusted machining parameters based on the standard laser machining parameters; and
   based on the adjustment of the standard laser machining parameters, initiating the laser machining system by laser cutting one of the plurality of materials using the control program.

2. The laser machining system according to claim 1, wherein the adjustment device can further be activated for adjusting the standard laser machining parameters based on at least one of a desired quality and a machining speed.

3. The laser machining system according to claim 1, wherein the adjustment device gradually adjusts the standard laser machining parameters in several adjustment steps.

4. The laser machining system according to claim 1, wherein the adjustment device adjusts the standard laser machining parameters based on correction rules.

5. The laser machining system according to claim 1, further comprising:
   at least one detector device that monitors at least one of the laser machining process and material properties and that determines a measuring signal, and
   an evaluation device that communicates with the detector device and that determines an actual value for at least one of the laser machining process and the material properties based on the measuring signal of the detector device.

6. The laser machining system according to claim 4, wherein the correction rules for the laser machining parameters are stored in the data storage.

7. A method for controlling a laser machining system configured to laser cut a plurality of materials using a control program, the method comprising:
   storing standard laser machining parameters in a data storage;
   accessing the standard laser machining parameters using the control program;
   receiving an operator input indicating that adjustment of the machining parameters by the adjustment device is required;
   based on receiving the operator input, selectively adjusting, using an adjustment device, the standard laser machining parameters in a preset fashion based on whether a process safety of laser machining is to be increased to provide adjusted laser machining parameters based on the standard laser machining parameters, the control program accessing the adjusted laser machining parameters; and
   based on the adjustment of the standard laser machining parameters, initiating the laser machining system by laser cutting one of the plurality of materials using the control program.

8. The method according to claim 7, further comprising:
calculating, using the adjustment device, the adjusted laser machining parameters; and
storing the adjusted laser machining parameters in a transmission file.

9. The method according to claim 7, further comprising:
generating, using a detector device, a measuring signal; and
determining, using an evaluation device, an actual value for at least one of the laser machining process and material properties, the evaluation device communicating with the detector device.

10. The method according to claim 9, wherein the standard laser machining parameters are adjusted in a preset fashion based on the actual value determined by the evaluation device.

* * * * *